US011216270B2

(12) United States Patent
Iyer et al.

(10) Patent No.: US 11,216,270 B2
(45) Date of Patent: Jan. 4, 2022

(54) METADATA DRIVEN WORKFLOW SEMANTICS FOR MANAGEMENT OPERATIONS

(71) Applicant: Dell Products L.P., Hopkinton, MA (US)

(72) Inventors: Pushkala Iyer, Round Rock, TX (US); Sudhir Vittal Shetty, Cedar Park, TX (US); Anurag Sharma, Cedar Park, TX (US); Marcelo Daniel Vinante, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/662,559

(22) Filed: Oct. 24, 2019

(65) Prior Publication Data

US 2021/0124572 A1    Apr. 29, 2021

(51) Int. Cl.
*G06F 8/656* (2018.01)

(52) U.S. Cl.
CPC .................... *G06F 8/656* (2018.02)

(58) Field of Classification Search
CPC ........................................................ G06F 8/656
See application file for complete search history.

(56) References Cited

U.S. PATENT DOCUMENTS

| | | | | |
|---|---|---|---|---|
| 6,113,652 A * | 9/2000 | Lysik | .................. | G06F 11/1433 717/170 |
| 6,505,255 B1 * | 1/2003 | Akatsu | .................... | H04L 12/66 370/351 |
| 9,762,589 B2 * | 9/2017 | Wood | ....................... | G06F 8/656 |
| 9,830,143 B2 * | 11/2017 | Chigurapati | ............ | G06F 8/656 |
| 9,965,203 B1 * | 5/2018 | Agarwala | ............ | G06F 16/1748 |
| 2003/0221124 A1 * | 11/2003 | Curran | .................... | H04L 63/10 726/12 |
| 2007/0276833 A1 * | 11/2007 | Sen | ......................... | G06F 16/27 |
| 2009/0158016 A1 * | 6/2009 | Clarke | .................. | G06F 9/3891 712/229 |
| 2009/0313630 A1 * | 12/2009 | Hori | ........................ | G06F 8/656 718/102 |
| 2010/0153771 A1 * | 6/2010 | Gordon | ................. | H04L 67/125 714/4.1 |
| 2012/0110055 A1 * | 5/2012 | Van Biljon | ............ | G06Q 30/04 709/201 |

(Continued)

OTHER PUBLICATIONS

Li et al., "A Novel Collaborative Fault-Tolerance Mechanism for Metadata Server Cluster", 2007, IEEE (Year: 2007).*

(Continued)

*Primary Examiner* — Wei Y Zhen
*Assistant Examiner* — Junchun Wu
(74) *Attorney, Agent, or Firm* — Chamberlain, Hrdlicka, White, Williams & Aughtry (57) ABSTRACT

In general, in one aspect, the invention relates to a method for managing nodes in a cluster. The method includes obtaining metadata from controllers on a node, processing the metadata to obtain solution groups and a processing sequence of the solution groups, notifying a solution manager to initiate performance of pre-update tasks associated with the node, and performing, after the notifying, an update of the nodes in the cluster based on the processing sequence of the solution groups.

20 Claims, 6 Drawing Sheets

(56) References Cited

U.S. PATENT DOCUMENTS

| | | | | |
|---|---|---|---|---|
| 2013/0018868 | A1* | 1/2013 | Chi | G06F 16/951 707/722 |
| 2013/0205128 | A1* | 8/2013 | Thompson | G06F 8/65 713/2 |
| 2013/0212234 | A1* | 8/2013 | Bartlett | G06F 9/5027 709/220 |
| 2013/0332456 | A1* | 12/2013 | Arkin | G06F 16/285 707/737 |
| 2014/0019495 | A1* | 1/2014 | Borthakur | G06F 11/1435 707/827 |
| 2016/0057009 | A1* | 2/2016 | Kadayam | H04L 41/0873 709/221 |
| 2016/0182497 | A1* | 6/2016 | Smith | H04L 63/0823 713/156 |
| 2018/0167448 | A1* | 6/2018 | Agarwal | H04L 67/02 |
| 2019/0138297 | A1* | 5/2019 | Wu | G06F 8/656 |

OTHER PUBLICATIONS

Sarr et al., "DTR: Distributed Transaction Routing in a Large Scale Network", 2008, Springer-Verlag Berlin Heidelberg (Year: 2008).*
Antoniu et al., "Peer-To-Peer Metadata Management for Knowledge Discovery Applications in Grids", 2008, SpringerLink (Year: 2008).*
Tang et al., "SoMeta: Scalable Object-centric Metadata Management for High Performance Computing", 2017, IEEE (Year: 2017).*
Ou et al., "Symmetric Active/Active Metadata Service for Highly Available Cluster Storage Systems", 2007, Citeseer (Year: 2007).*

\* cited by examiner

METADATA DRIVEN WORKFLOW SEMANTICS FOR MANAGEMENT OPERATIONS

BACKGROUND

Computing devices may include any number of internal components such as processors, memory, and persistent storage. These computing devices may need to be updated once they are deployed. Traditionally, the mechanisms for updating a given computing device do not take into account the relationships between the computing device and the various related computing devices.

SUMMARY

In general, in one aspect, the invention relates to a method for managing nodes in a cluster, the method comprising obtaining metadata from at least one of a plurality of controllers, wherein each node of a plurality of nodes comprises one of the plurality of controllers, processing the metadata to obtain solution groups and a processing sequence of the solution groups, wherein each of the plurality of nodes is associated with one of the solution groups, notifying a solution manager to initiate performance of pre-update tasks associated with at least one of the plurality of nodes, and performing, after the notifying, an update of at least one of the plurality of nodes in the cluster based on the processing sequence of the solution groups.

In general, in one aspect, the invention relates to a non-transitory computer readable medium (CRM) storing instructions for managing nodes in a cluster, the instructions comprising functionality for obtaining metadata from at least one of a plurality of controllers, wherein each node of a plurality of nodes comprises one of the plurality of controllers, processing the metadata to obtain solution groups and a processing sequence of the solution groups, wherein each of the plurality of nodes is associated with one of the solution groups, notifying a solution manager to initiate performance of pre-update tasks associated with at least one of the plurality of nodes, and performing, after the notifying, an update of at least one of the plurality of nodes in the cluster based on the processing sequence of the solution groups.

In general, in one aspect, the invention relates to a system, comprising: a processor, memory comprising instructions, which when executed by the processor enables the system to perform a method, the method comprising: obtaining metadata from at least one of a plurality of controllers, wherein each node of a plurality of nodes comprises one of the plurality of controllers, processing the metadata to obtain solution groups and a processing sequence of the solution groups, wherein each of the plurality of nodes is associated with one of the solution groups, notifying a solution manager to initiate performance of pre-update tasks associated with at least one of the plurality of nodes, and performing, after the notifying, an update of at least one of the plurality of nodes in a cluster based on the processing sequence of the solution groups.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as N to Z, may also include any number of elements. The number of elements of the first data structure and the number of elements of the second data structure may be the same or different.

In general, embodiments of the invention relate to managing a cluster using one or more solution managers and one or more infrastructure managers. More specifically, the solution managers are configured to implement one or more solutions across all or a subset of the cluster. As such, the solution managers understand the operation of the various nodes in the cluster including the workloads that are executing (or able to execute) on the nodes. The infrastructure managers are configured to maintain the various nodes in the cluster by, for example, updating firmware (or other software) in the nodes. However, the infrastructure managers typically do not have an understanding of the operation of the various nodes. In order to ensure that the negative impact of updating of the nodes in the cluster is minimized, embodiments of the invention enable the solution managers and the infrastructure managers communicate via the controllers in the nodes. Specifically, there typically does not exist a mechanism to enable the solution managers to directly provide information about the operation of the nodes to the infrastructure managers. Accordingly, in one or more embodiments of the invention, the solution managers, using application programming interfaces (APIs) provided by the controllers on the nodes, write metadata to the controller. The infrastructure managers may then obtain this metadata from the controllers and use it to orchestrate the updating of the nodes in the cluster.

The following is an overview of the interaction between the solution managers and the infrastructure managers in accordance with one or more embodiments of the invention. Turning to the overview, the infrastructure manager identifies metadata, which is located in the controller that was previously populated by the solution manager. The infrastructure manager obtains and processes the metadata to identify one or more solution groups and a processing sequence(s). The infrastructure manager may then send a notification to the solution manager, which informs the solution manager that particular nodes in a solution domain (i.e., the nodes that are managed by the particular solution manager) will be updated. This notification allows the solution manager to perform any tasks necessary to the servers prior to the update. Thereafter, the infrastructure manager performs the update. After the update is complete, the infrastructure manager may send a notification to the solution manager, e.g., via the controller, to allow the solution manager to perform any post-update tasks.

Figure 1:
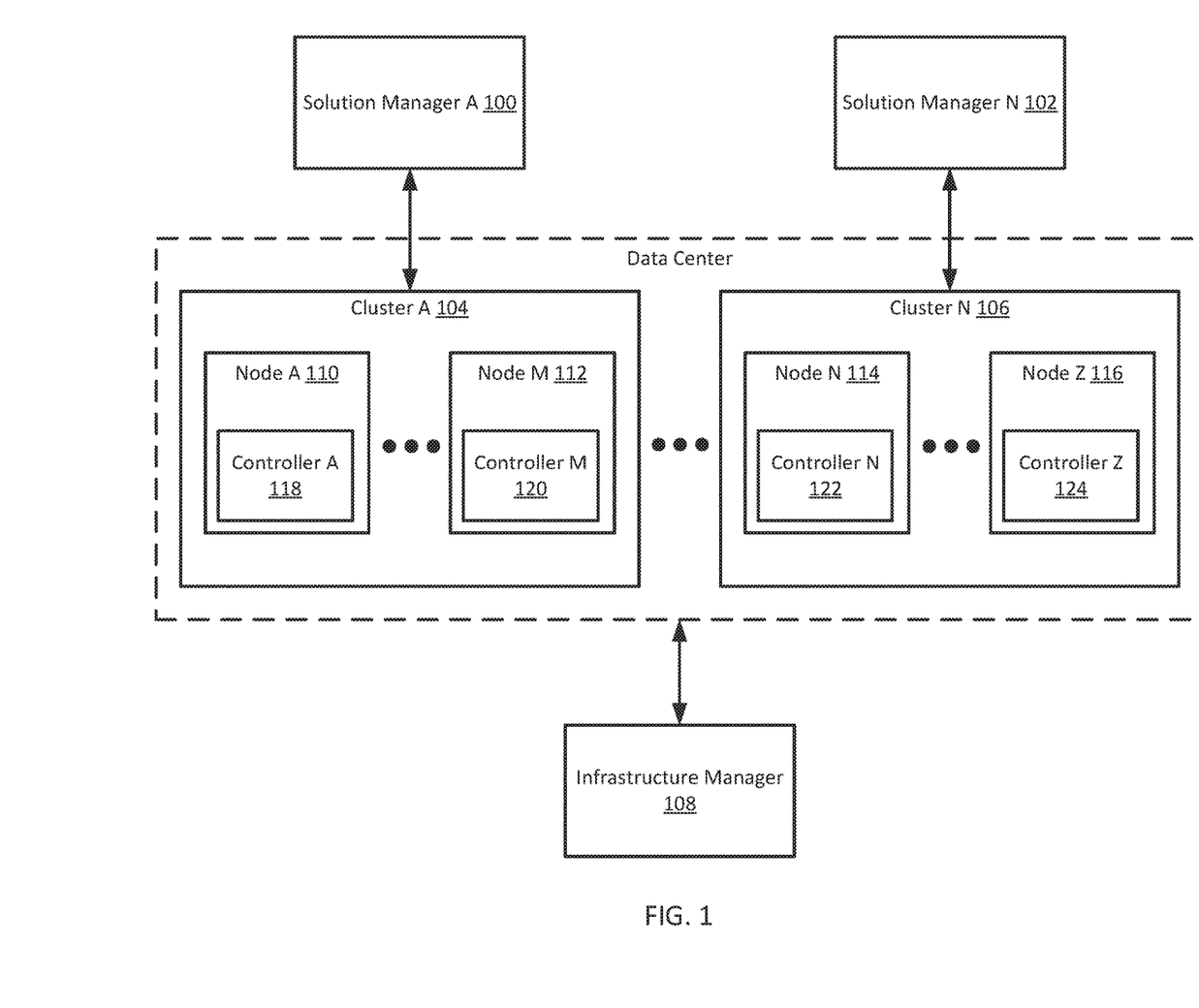
FIG. 1 shows a system in accordance with one or more embodiments of the invention.

FIG. 1 shows an example system in accordance with one or more embodiments of the invention. The system includes one or more solution managers (100, 102), one or more clusters (104, 106) and an infrastructure manger (108). The system may include additional, fewer, and/or different components without departing from the invention. Each component may be operably connected via any combination of wired and/or wireless connections. Each component illustrated in FIG. 1 is discussed below.

In one or more embodiments of the invention, the solution managers (100, 102) are configured to provide metadata to the controllers (118, 120, 122, 124) that are on the nodes (110, 112, 114, 116). The solution managers, using APIs provided by the controllers on the nodes, write metadata to the various controllers in the cluster. In another embodiment of the invention, one or more nodes may have all or a portion of the metadata pre-installed. The metadata may be used by the infrastructure managers to manage the nodes. For example, the metadata may be used to specify device capabilities and management information. The metadata may also be used to specify information that is used by the infrastructure manager(s) when updating the nodes in the cluster(s).

The metadata may be encoded using any format(s). For example, the metadata may be encoded using eXtensible Markup Language (XML) and/or JavaScript Object Notation (JSON). The invention is not limited to these formats.

The following is a non-limiting listing of information that may be encoded in the metadata:

(i) Node Capabilities—To toggle on/off management/monitoring features on the nodes (e.g., the firmware updates may be turned off in a specific solution group in a cluster; the powering on/off of the nodes in a cluster may be staggered based on a process sequence for each node in a cluster, etc.), (ii) Management Uniform Resource Location (URL)—enables customization of a link and launch management URL for the management application (e.g., a direct the link to launch URL to a local or remote management console (which may be, e.g., a solution manager or a cluster management application), (iii) Grouping—enables customization of the grouping hierarchy in which the node is placed post discovery (e.g., which nodes are associated with a solution group) (additional detail provided below);

(iv) Clustering—enables co-location of nodes in a cluster in a display on a local or remote management console;

(v) Custom tags—user defined tags (e.g., to facilitate the tracking of nodes as they move around in a data center (i.e., the physical infrastructure in which the clusters are located), to provide support for "tool tips", to enable custom queries using the tags, etc.), and (v) Custom Graphics—enables customization of image file(s) to be used as the solution graphic, which is used in the display on the local or remote management console.

Continuing with the discussion of the metadata, in one embodiment of the invention, the grouping metadata may specify one or more solution groups to which a node belongs. Said another way, each solution manager manages one or more sets of nodes. Each set of nodes that the solution manager manages is a separate solution group, which may be identified using a unique identifier (i.e., a solution group identifier). The solution group identifier may only be unique for all solution groups in a given cluster or data center. Depending on the implementation of the cluster, each node may belong to a single solution group or multiple solution groups. As discussed below, the solution groups may be used as part of the updating (or other management) of the nodes by the infrastructure manager.

Continuing with the discussion of the metadata, as discussed above, the metadata may be used to facilitate the updating of the nodes in the cluster. In such embodiments, the metadata may include (or additionally include) one or more of the following: (i) an operation name for an operation, (ii) a sequence number associated with the operation for the node; (iii) actions to take in the event an error is encountered during the operation; (iv) pre-update tasks to be performed by the solution manager that is managing the solution group with which the node is associated; and (v) post-update tasks to be performed by the solution manager that is managing the solution group with which the node is associated.

If the metadata specifies multiple operations, then items (i)-(v) may be specified on a per-operation basis. Further, if the node is associated with multiple solution groups, then items (i)-(v) may be specified on a per-solution group per-operation basis.

The following is a non-limiting example of metadata that may be stored on a given node by a solution manager.

Example Metadata

```
<ManagementOperations>
<Operation>
  <Name>FWUpdate</Name>
  <Sequence>1</Sequence>
  <OnError>Stop,Rollback</OnError>
  <Hooks>
    <Hook>
      <Type>Pre</Type>
      <URI>https://10.25.0.210/api/UpdateSvc/Actions/UpdateSvc.PreUpdate</URI>
    </Hook>
```

```xml
<Hook>
    <HookType>Post</HookType>
    <URI>https://10.25.0.210/api/UpdateSvc/Actions/UpdateSvc.PostUpdate</URI>
</Hook>
<Hook>
    <Type>Post</Type>
    <URI>https://10.25.0.210/api/UpdateSvc/Actions/UpdateSvc.Notify</URI>
</Hook>
</Hooks>
</Operation>
<Operation>
    <Name>PowerOn</Name>
    <Sequence>10</Sequence>
    <OnError>Continue</OnError>
    <Hooks>
        <Hook>
            <Type>Post</Type>
            <URI>https://10.25.0.210/api/PowerSvc/Actions/PowerSvc.PostOp</URI>
        </Hook>
    </Hooks>
</Operation>
</ManagementOperations>
```

Continuing with the discussion of metadata, in one embodiment of the invention, the solution manager includes functionality to generate and/or obtain (e.g., from a user or another computing device (see e.g., FIG. 5)) the metadata for each of the nodes in a given solution group and then store the metadata in the appropriate controllers in the nodes within the solution group (see e.g., FIGS. 4A-4B, below).

Continuing with the discussion of solution managers, in one or more embodiments of the invention, the solution managers (100, 102) perform pre-update tasks and post-update tasks. The pre-update tasks include any tasks that are to be performed by the solution managers (100, 102) prior to an update of the nodes (110, 112, 114, 116) in the clusters (104, 106). Whereas, post-update tasks are any tasks performed by the solution managers (100, 102) after an update of the nodes (110, 112, 114, 116) in the clusters (104, 106) has been completed.

The pre-update tasks and the post-update tasks may, in one embodiment of the invention, take the form of uniform resource identifier (URI) that includes an Internet Protocol (IP) address of the solution manager as well as the task for the solution manager to perform. Depending on the implementation of the invention, the infrastructure manager may process the URI, which results in a request being sent (via a network) from the infrastructure manager to the solution manager. Upon receipt of such request, the solution manager may initiate performance of the task specified in the URI.

Figure 5:
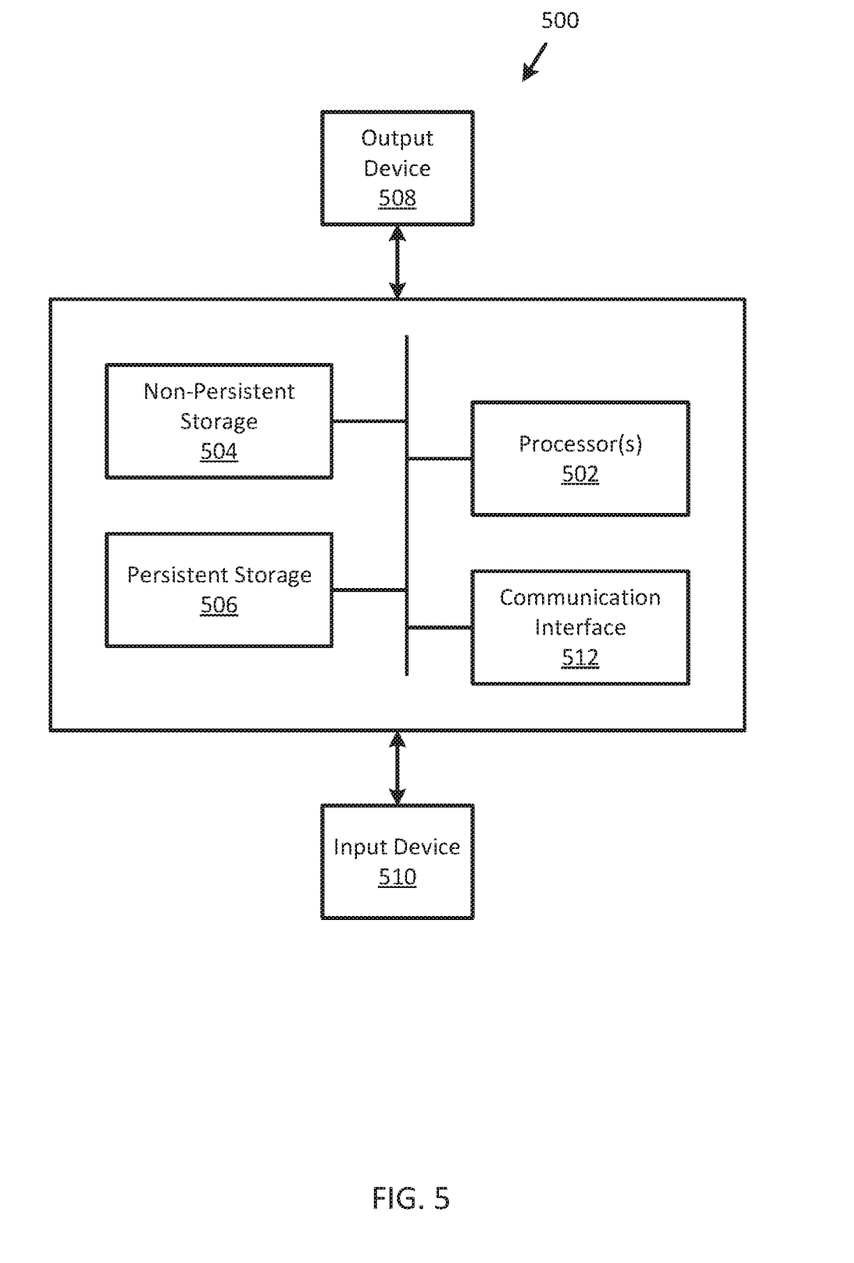
FIG. 5 shows a diagram of a computing device in accordance with one or more embodiments of the invention.

In one or more embodiments of the invention, the solution managers (100, 102) are implemented as computing devices (see, e.g., FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent described throughout this application and/or all, or a portion thereof.

In one or more embodiments of the invention, the solution managers (100, 102) are implemented as a logical device. The logical device may utilize the computing resources of any number of computing devices (within or external to the cluster) and thereby provide the functionality of the solution managers (100, 102).

In one or more embodiments of the invention, the clusters (104, 106) include nodes (110, 112, 114, 116). The nodes (110, 112, 114, 116) may include operating systems or hypervisors (not shown), virtual machines (not shown), and controllers (118, 120, 122, 124). The nodes are updated by the infrastructure manager as discussed throughout this application.

In one or more embodiments of the invention, the nodes (110, 112, 114, 116) are each implemented as computing devices (see e.g., FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent described throughout this application and/or all, or a portion thereof.

In one or more embodiments of the invention, the nodes (110, 112, 114, 116) are each implemented as a logical device. The logical device may utilize the computing resources of any number of computing devices and thereby provide the functionality of the nodes (110, 112, 114, 116).

In one or more embodiments of the invention, the nodes (110, 112, 114, 116) include controllers (118, 120, 122, 124). The controllers include functionality to store the metadata received from the solution managers. The metadata may be stored in physical memory that is within the controller. Alternatively, the metadata may be stored on the node (i.e., the node in which the controller is located) and be accessible to the controller.

In one or more embodiments of the invention, the controllers (118, 120, 122, 124) are physical devices. The physical device may include circuitry. The physical device may include a field programmable gate array, application specific integrated circuit, digital signal processor, microcontroller, and/or an embedded processor. The physical device may include persistent storage that stores computing instructions which when executed by the physical device causes the physical device to perform the functions of the controllers (118, 120, 122, 124) described throughout this application.

In one or more embodiments of the invention, the controllers (118, 120, 122, 124) are implemented as a logical entity. The logical device may utilize the computing resources of any number of computing devices and thereby provide the functionality of the controllers (118, 120, 122, 124).

In one or more embodiments, of the invention, the infrastructure manager (108) performs updates of the nodes (110, 112, 114, 116) in the clusters (104, 106). The updates are performed after obtaining metadata from the controllers (118, 120, 122, 124) for customization and/or management of the update(s). Additionally, the infrastructure manager (108) sends, e.g., via the controllers (118, 120, 122, 124), notifications to the solution managers (100, 102) in regards to pre-update tasks and post-update tasks.

In one or more embodiments of the invention, the infrastructure manager (108) is implemented as computing devices (see e.g., FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent described throughout this application and/or all, or a portion thereof.

In one or more embodiments of the invention, the infrastructure manager (108) is implemented as a logical device. The logical device may utilize the computing resources of any number of computing devices (within or external to the cluster) and thereby provide the functionality of the infrastructure manager (108).

In one embodiment of the invention, the nodes, the solution managers, and the infrastructure managers include credentials and functionality to authenticate each other (as appropriate) to enable the interaction between the aforementioned elements as described throughout this application.

While the system of FIG. 1 has been illustrated and described as including a limited number of specific components, a system in accordance with one or more embodiments of the invention may include additional, fewer, and/or different components without departing from the invention.

Figure 2:
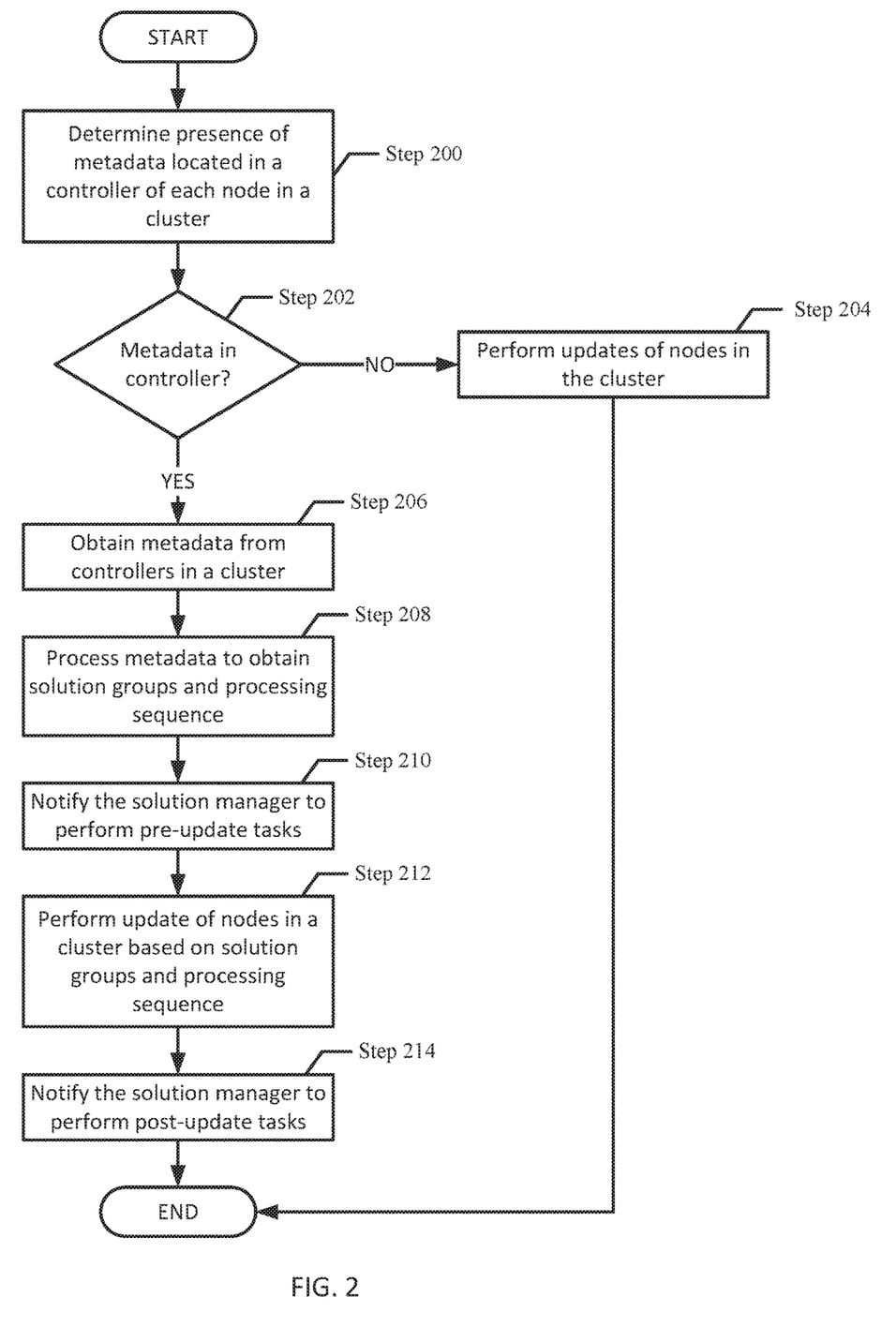
FIG. 2 shows a method for updating nodes in a cluster in accordance with one or more embodiments of the invention.
Figure 3:
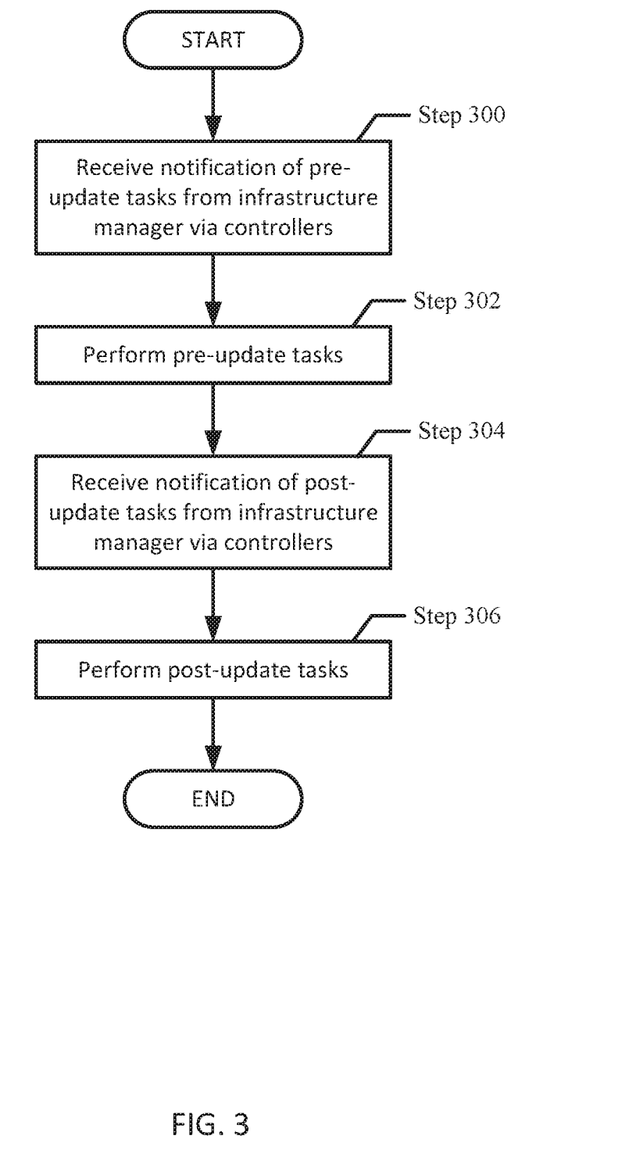
FIG. 3. shows a method for performing pre-update and post-update tasks in accordance with one or more embodiments of the invention.

FIGS. 2-3 show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2-3 may be performed in parallel with any other steps shown in FIGS. 2-3 without departing from the scope of the invention.

Prior to the methods shown in FIGS. 2-3, the solution manager has identified nodes that are part of a solution group, determined at least one operation to perform on the solution group, specified a processing sequence for the solution group for the operation, specified zero, one or more pre-operation tasks, zero, one or more post-operation task, and has optionally specified on-error behavior if an error is encountered during the operation. The solution manager may obtain the aforementioned information from a user(s) or another computing device instead of generating the aforementioned information itself. Further, the solution manager then provides, on a per-node basis, metadata for the node (see example provided above). Specifically, the metadata is provided to each node may not specify the entire processing sequence for the operation; rather, it may only specify the processing sequence number for the particular node.

The following is a non-limiting example of the processing sequence number. Consider a scenario in which there are four nodes (node A, node B, node C, and node D) in a solution group. Further, in this scenario assume that the processing sequence for a particular operation is as follows: Node A, Node B and Node C in parallel, Node D. The processing sequence numbers for each node would then be Node A—1, Node B—2, Node C—2, and Node D—3. The metadata that is provided for Node A would specify a processing sequence number (also referred to as a sequence number) of 1, the metadata that is provided for Node B would specify a processing sequence number of 2, the metadata that is provided for Node C would specify a processing sequence number of 2, and the metadata that is provided for Node D would specify a processing sequence number of 3. The per-node metadata may then be provided (as discussed above) to the individual controllers on the corresponding nodes.

Continuing with the discussion of FIG. 2, FIG. 2 shows a flowchart for a method for updating nodes in a cluster in accordance with one or more embodiments of the invention. The method may be performed by an infrastructure manager.

Turning to FIG. 2, in step 200, the presence of metadata located in a controller of each node in a cluster is determined. In one or more embodiments, the infrastructure manager may query the controllers on the nodes in the cluster for the presence of metadata. The metadata is embedded in each node. Additionally, the metadata is configured to include customizations of management operations (see, e.g., FIG. 1).

In step 202, a determination is made as to whether there is a presence of metadata located in at least one controller. The presence of metadata alerts the infrastructure manager of the process required for completing the updates. If there is metadata in at least one controller, the process proceeds to step 206. If there is no metadata in the controller the process proceeds to step 204.

In step 204, the infrastructure manager may perform the updates of nodes in the cluster using a default configuration as there is no metadata in the nodes that specifies any alternative steps to take with respect to updating the nodes. The process then ends.

If there is metadata in the nodes, then in step 206, the metadata is obtained from each controller located in each node in the cluster. In one of more embodiments of the invention, the infrastructure manager obtains and reads the metadata obtained from the controllers using one or more APIs that are provided by the controllers.

In step 208, the infrastructure manager processes the metadata to obtain a solution group(s) and a processing sequence(s). The processing may include identifying zero, one or more solution groups. Further, a processing order may be determined for each of the nodes. The processing order may (or may not) be specified on a per-solution group basis. Further, a processing order may also be determined for the solution groups (as an alternative to or in addition to) the processing order determined for each node.

The processing step 208 may include aggregating all of the metadata obtained from each of the nodes, parsing the metadata to extract the relevant solution group identifiers and sequence numbers, and then determining which nodes belong to which solution groups and the processing sequence of each node within the solution group(s).

The following describes various non-limiting examples of the processing order that may be determined using the metadata.

Example 1—Consider a scenario in which Node A and Node B may be in Group 1; Node C and Node D may be in Group 2; and Node E and Node F may be in Group 3. The solution groups (e.g., Groups 1-3) may be put in a processing sequence in which each node is encoded with a sequence number. The sequence number defines the order in which all nodes in the solution group get updated. For example, Group 1 may have a sequence number of 1; Group 2 may have a sequence number of 3; and Group 3 may have a sequence number of 3.

Example 2—The nodes may not be put into solution groups, but the nodes may be sequenced. Therefore, the sequence number may be given to each node instead to each solution group. For example Node A may have a sequence number of 1, Node B may have a sequence number of 2, and Node C may have a sequence number 3.

Example 3—The nodes within each solution group may be associated with a sequence number, where the sequence number specifies the relative order of processing of the node (relative to other nodes) in solution group.

Continuing with the discussion of FIG. 2, in step 210, the infrastructure manager notifies the solution manger to perform one or more pre-update tasks that are specified in the metadata. The pre-update tasks include any tasks perform by the solutions manger prior to the updating of any nodes in a solution group. In one or more embodiments, the infrastructure manger may transmit a node identifier(s) in the notification payload to the solution manager (see, e.g., FIG. 3, Step 302). The solution manager may use this information to perform a specific action(s) on a specific node(s) in the solution group.

In step 212, the infrastructure manager performs the updates based on solution groups and processing sequence. For example, in a scenario where the infrastructure manager is performing a firmware update, referring back to Example 1 in step 208, Group 1 receives the firmware update first; then Group 2; and Group 3 receives the firmware update last.

In another scenario, the update requires the infrastructure manager to stagger the powering on of the nodes, referring back to Example 2 in step 208, Node A is powered on first; Node B is powered on second; and Node C is powered on third.

Furthermore, the groups and sequence numbers may be specified, enabling hierarchical updates. For example, consider the following scenario, Nodes A-G may be grouped into the following solution groups: Region 1, which includes Nodes A and B and Region 2, which includes Nodes C-G. Region 2 may be further sub-divided into Availability Zone 1 and Availability Zone 2. Availability Zone 1 may include Nodes D and E, and Availability Zone 2 may include Nodes F and G.

Additionally, based on the solution groups, Nodes A and B may have a sequence number of 1.1. Node C may have a sequence number of 1.2. Node D in Availability Zone 1 may have a sequence number of 1.2.1.1. Node E in Availability Zone 1 may have a sequence number of 1.2.1.2. Node F in Availability Zone 2 may have a sequence number of 1.2.2.1. Node G in Availability Zone 2 may have a sequence number of 1.2.2.2.

As a result, Region 1, which includes Node A and Node B, is updated first. Next, Node C in Region 2 is updated. The nodes in the Availability Zones are then updated in the following Sequence: Node D, Node E, Node F, Node G.

Continuing with the discussion of FIG. 2, in step 214, the infrastructure manager notifies the solution manger to perform one or more post-update tasks that are specified in the metadata. The post-update tasks include any tasks to be performed by the solutions manger after the updating of any nodes in a solution group. In one or more embodiments, the infrastructure manger may transmit a node identifier(s) in the notification payload to the solution manager (see, e.g., FIG. 3, Step 302). The solution manager may use this information to perform a specific action(s) on a specific node(s) in the solution group.

FIG. 3 shows a flowchart for a method for performing pre-update and post-update tasks in accordance with one or more embodiments of the invention. The method may be performed by solution managers.

Turning to FIG. 3, in step 300, the solution manger receives a notification of pre-update tasks from the infrastructure manager e.g., via the controllers. In one or more embodiments, the controllers receive the request payload from the infrastructure manager (see, e.g., FIG. 2, Step 210). The controllers transmit the request payload to the solution manager.

In one or more embodiments, the pre-update tasks may include, but are not limited to, the following: placing the nodes in maintenance mode prior to receiving the update(s); and if a node is hosting applications or workloads, moving the applications or workload from one or more nodes in the solution groups to another node in the solution group or to another node in the cluster that is not part of the solution group.

In step 302, the solution manager performs the pre-update tasks. For example, the solution manger received a notification that Nodes A and B in a cluster are being updated. In response to the notification, the solution manager may moves applications executing on Nodes A and B in the cluster to Nodes C and D in the same cluster. The pre-update tasks may specify specific tasks to be performed and/or include a notification that an update to specific nodes to going to be performed. In the latter case, the solution manager includes a set of tasks that it performs in response to receiving a notification.

The solution manger may notify infrastructure manager that the per-update tasks have been performed. The solution manager may then wait until another notification is received to perform post-update tasks.

In step 304, the solution manger receives a notification of post-update tasks from the infrastructure manager, e.g., via the controllers. In one or more embodiments, the controllers receive the request payload and status from the infrastructure manager (see, e.g., FIG. 2, Step 214). The controllers transmit the request payload and status to the solution manager.

In one or more embodiments, the post-update tasks may include, but are not limited to, the following: taking the nodes out of maintenance mode after receiving the update(s); moving the applications or workloads back from the secondary node to the primary node in the cluster; rebuilding file system metadata associated with one or more nodes; and notifying users (e.g., administrators) that the update is complete.

In step 306, the solution manger performs the post-update tasks. The post-update tasks may specify specific tasks to be performed and/or include a notification that an update to specific nodes to going to be performed. In the latter case, the solution manager includes a set of tasks that it performs in response to receiving a notification.

Referring back to step 302, consider a scenario in which the solution manager receives a notification to perform post-update tasks. In response to the notification, the solution manager moves the applications executing on Nodes C and D (previously stored on Nodes A and B in the cluster) back to Nodes A and B in the same cluster.

The solution manger may notify infrastructure manager that the post-update tasks have been performed.

While FIGS. 2-3 relate to using the metadata to facilitate updating of nodes in the cluster, the solution managers may transmit other metadata (as discussed above) to the nodes via the controllers. This metadata may then be read by the infrastructure manager and used to manage the nodes. Said another way, the solutions manager and the infrastructure managers may communicate a customized set of metadata via the controllers. This allows the infrastructure to obtain additional management information that it can then use to perform its other operations.

Example

Figure 4A:
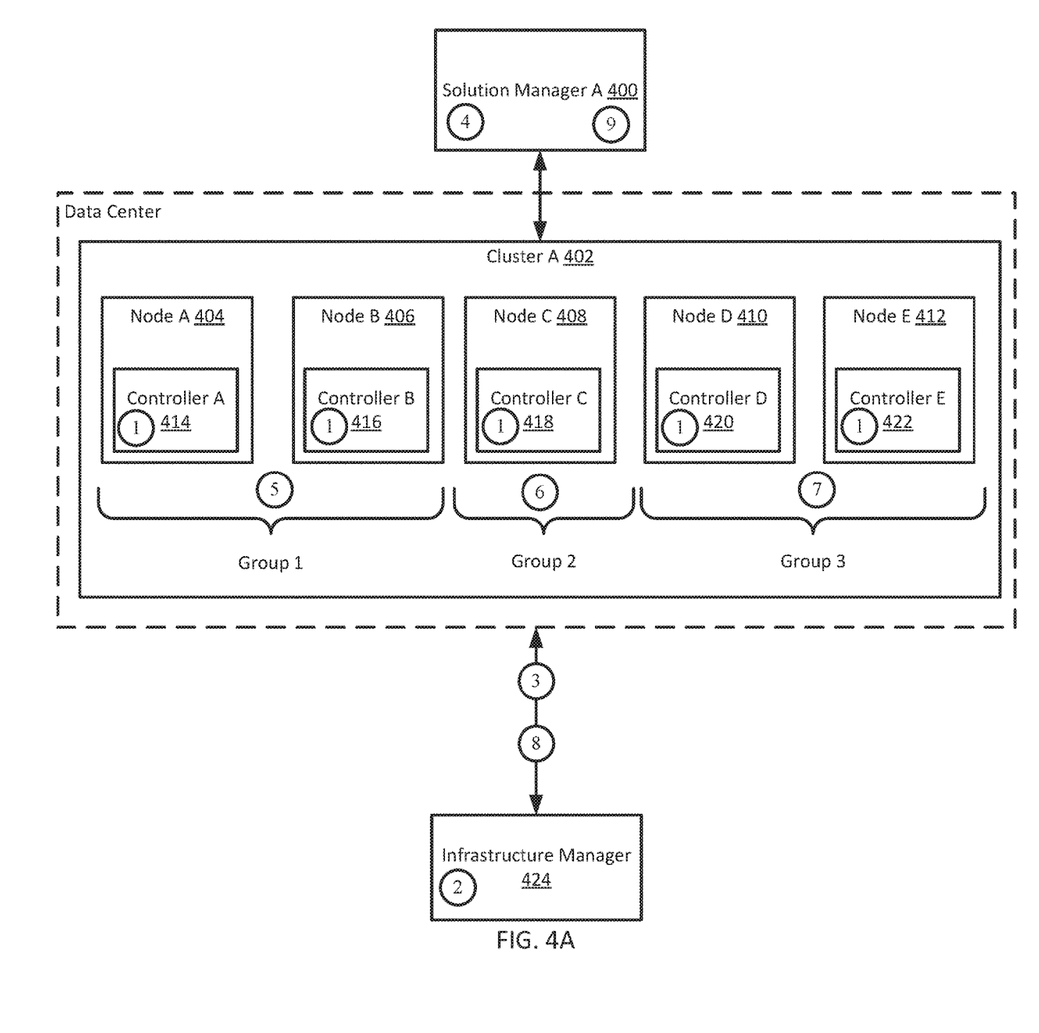
FIGS. 4A-4B show an example in accordance with one or more embodiments of the invention.
Figure 4B:
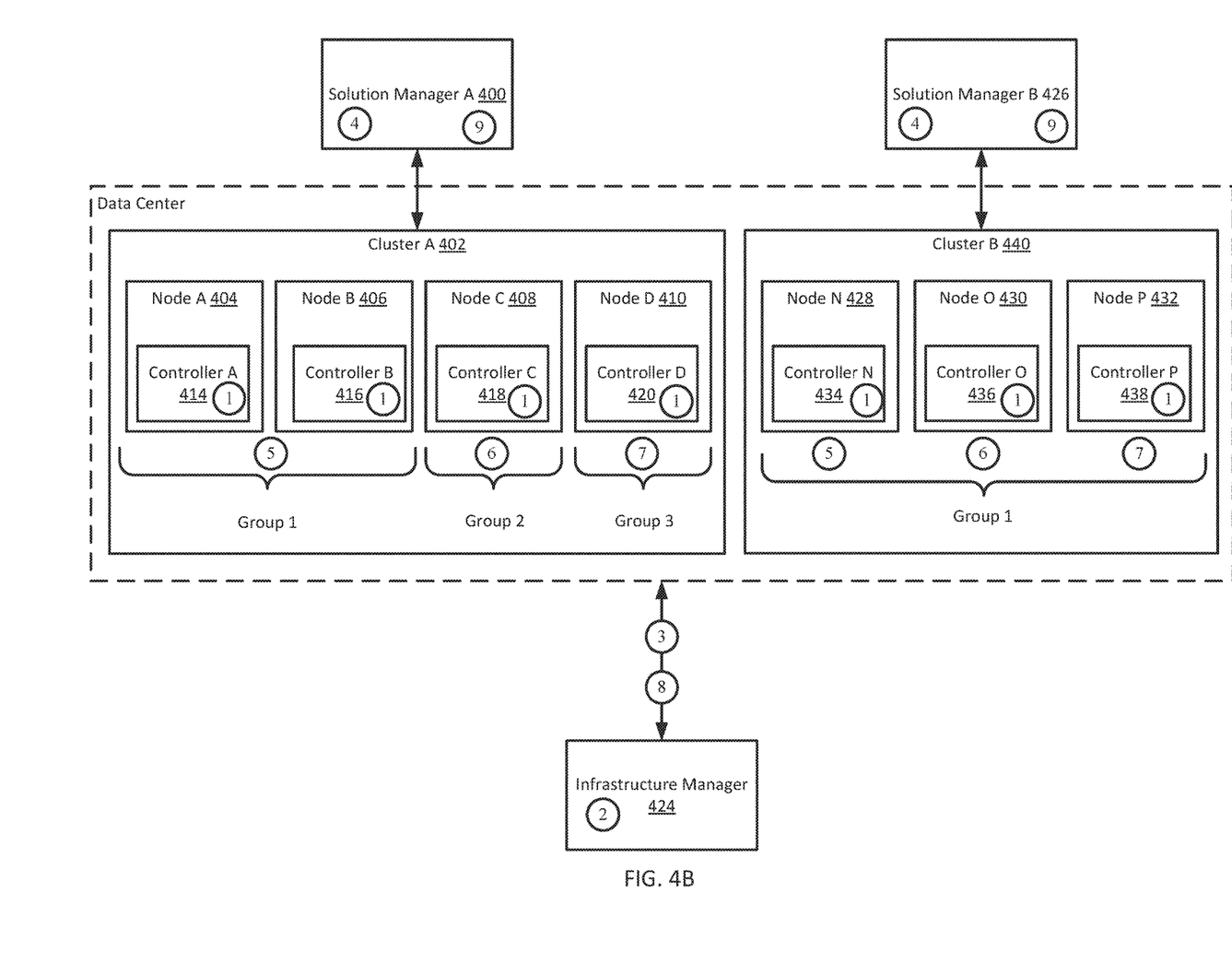

FIGS. 4A-4B show an example in accordance with one or more embodiments. The example is not intended to limit the scope of the invention.

Referring to FIG. 4A, consider a scenario in which a system includes a solution manger (i.e., Solution Manager A (400)), a cluster (i.e., Cluster A (402)) including five nodes (i.e., Node A (404), Node B (406), Node C (408), Node D (410), Node E (412)), and an infrastructure manager (424). Each node includes a controller (i.e., Controller A (414), Controller B (416), Controller C (418), Controller D (420), Controller E (422)).

Further assume that the infrastructure manager (424) needs to perform a firmware update of the nodes (i.e., Node A (404), Node B (406), Node C (408), Node D (410), Node E (412)) in Cluster A (402). The infrastructure manager (424) identifies the presence of metadata located in each controller (i.e. Controller A (414), Controller B (416), Controller C (418), Controller D (420), Controller E (422)) [1]. Also, the infrastructure manager (424) obtains and processes the metadata to obtain solution groups and a processing sequence [2]. The solution groups and sequence numbers are as follows: Group 1 includes Node A (404) and Node B (406), which has a sequence number of 1; Group 2 includes Node C (408), which has a sequence number of 2; and Group 3 includes Node D (410) and Node E (412), which has a sequence number of 3.

Thereafter, the infrastructure manager (424) sends a notification to Solution Manager A (400) to perform pre-update tasks [3]. The solution manager receives the notification and performs a pre-update task of placing the nodes in maintenance mode [4]. Based on the solution group and processing sequence, the infrastructure manager (424) performs the update of Group 1 first [5]; then, Group 2[6]; and last, Group 3 [7]. A post-update notification is transmitted to Solution Manager A (400) [8]. Solution Manager A performs the post update task of taking the nodes (i.e. Node A (404), Node B (406), Node C (408), Node D (410), Node E (412)) out of maintenance mode [9].

Referring to FIG. 4B, consider a scenario in which a system includes two solution mangers (i.e., Solution Manager A (400) and Solution Manager B (426)), two clusters (i.e., Cluster A (402) and Cluster B (440)), and an infrastructure manager (424). Cluster A (402) includes four nodes (i.e., Node A (404), Node B (406), Node C (408), Node D (410)). Cluster B (440) includes three nodes (i.e., Node N (428), Node O (430), and Node P (432)). Each node includes a controller (i.e., Controller A (414), Controller B (416), Controller C (418), Controller D (420), Controller N (434), Controller O (436), and Controller P (438)).

Further assume that the infrastructure manager (424) needs to perform a firmware update of the nodes (i.e., Node A (404), Node B (406), Node C (408), Node D (410) in Cluster A (402); and Node N (428), Node O (430), Node P (432) in Cluster B (440)). The infrastructure manager (424) identifies the presence of metadata located in each controller (i.e. Controller A (414), Controller B (416), Controller C (418), Controller D (420), Controller N (434), Controller O (436), Controller P (438)) [1]. Also, the infrastructure manager (424) obtains and processes the metadata to obtain solution groups and a processing sequence [2]. The solution groups and sequence numbers for Cluster A are as follows: Group 1 includes Node A (404) and Node B (406), which has sequence number of 1; Group 2 includes Node C (408), which has a sequence number of 2; and Group 3 includes Node D (410), which has a sequence number of 3. The solution groups and sequence process for Cluster B are as follows: Group 1 includes Node N (434), which has sequence number of 1; Node O (436), which has a sequence number of 2; and Node P (438), which has a sequence number of 3.

Thereafter, the infrastructure manager (424) sends notifications to Solution Manager A (400) and Solution Manager B (426) to perform pre-update tasks [3]. Solution Manager A and Solution Manager B receive the notifications and perform the pre-update tasks of placing the nodes in maintenance mode [4]. Based on the solution group and processing sequence, the infrastructure manager (424) concurrently performs the update of Group 1 for Cluster A and Node N [5]; then, Group 2 for Cluster A and Node O [6]; and last, Group 3 for Cluster A and Node P [7]. The updating for the different groups can be performed concurrently because they are related to distinct solution managers. The infrastructure manager transmits a post-update notification to Solution Manager A (400) and Solution Manager B (426) [8]. Solution Manager A (400) and Solution Manager B (426) perform the post update task of taking the nodes (i.e., Node A (404), Node B (406), Node C (408), Node D (410) in Cluster A (402); and Node N (428), Node O (430), Node P (432) in Cluster B) out of maintenance mode [9].

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506).

Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may enable one or more of the of following: (i) enable communication between the infrastructure manager and the solution manager; (ii) implement custom logic for management operations by the infrastructure manager using metadata provided by the solution manager; (iii) customization of metadata stored on each node; (iv) dynamic interpretation of the metadata stored on each node for classification and management purposes without requiring new versions of console software; and (v) customization data may be modified at run-time to specify a modification to the workflow.

Further, in various embodiments of the invention, the metadata may be used to implement a richer user interface (UI) by the Infrastructure Manager. The richer UI may, based on the information encoded in the metadata, show nodes organized and, optionally, represented using different visual representations (e.g., different colors, different images, etc.). This information may then be used by, e.g., a Data Center Admin, to perform tasks (which may be manual tasks) on the cluster, e.g. replace drives, replace power supply units, etc. in a manner that does not (or limits) the negative impact on the operation (or performance of the cluster).

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a plurality of nodes in a cluster, the method comprising:
    determining presence of metadata in a plurality of controllers, wherein each node of the plurality of nodes comprises one of the plurality of controllers;
    obtaining the metadata from one or more of the plurality of controllers, wherein the metadata from each controller comprises:
        an identifier that identifies a solution group, wherein each of the plurality of nodes is associated with at least one of the solution groups;
        a processing sequence number associated with the solution group; and
        pre-update tasks associated with updating the node associated with the controller;
    processing the metadata to obtain the solution groups and a processing sequence that specifies a sequence for performing updates on one or more nodes associated with the solution groups;
    notifying a solution manager to initiate performance of the pre-update tasks associated with at least one of the one or more nodes associated with the solution groups; and
    performing, after the notifying, an update of the at least one of the one or more nodes in the cluster based on the solution groups and processing sequence of the solution groups.

2. The method of claim 1, wherein the solution manager performs the pre-update tasks.

3. The method of claim 1, wherein the pre-update tasks comprise placing the plurality of nodes in the cluster in maintenance mode.

4. The method of claim 1, wherein the pre-update tasks comprise moving a workload from a first node of the plurality of nodes to a second node of the plurality of nodes in the cluster, wherein the second node is not one of the at least one of the plurality of nodes being updated.

5. The method of claim 1, further comprising:
    after performing the update of the one or more of nodes in the cluster:
        notifying the solution manager to initiate a performance of post-update tasks associated with at least one of the plurality of nodes.

6. The method of claim 5, wherein the post-update tasks comprise notifying the solution manager that the update is complete.

7. The method of claim 5, wherein the post-update tasks comprise removing at least one of the plurality of nodes in the cluster from a maintenance mode, wherein the at least one of the plurality of nodes was placed in maintenance mode in response to performance of a pre-update task.

8. The method of claim 5, wherein the post-update tasks comprise moving a workload from a second node of the plurality of nodes to a first node of the plurality of nodes, wherein the workload was moved from the first node the second node in response to performance of a pre-update task.

9. The method of claim 5, wherein the post-update tasks comprise rebuilding file system metadata associated with at least one of the plurality of nodes.

10. A non-transitory computer readable medium (CRM) storing instructions for managing a plurality of nodes in a cluster, the instructions comprising functionality for:
    determining presence of metadata in a plurality of controllers, wherein each node of the plurality of nodes comprises one of the plurality of controllers;
    obtaining the metadata from one or more of the plurality of controllers, wherein the metadata from each controller comprises:
        an identifier that identifies a solution group, wherein each of the plurality of nodes is associated with at least one of the solution groups;
        a processing sequence number associated with the solution group; and
        pre-update tasks associated with updating the node associated with the controller;
    processing the metadata to obtain the solution groups and a processing sequence that specifies a sequence for performing updates on one or more nodes associated with the solution groups;
    notifying a solution manager to initiate performance of the pre-update tasks associated with at least one of the one or more nodes associated with the solution groups; and
    performing, after the notifying, an update of the at least one of the one or more nodes in the cluster based on the solution groups and processing sequence of the solution groups.

11. The CRM of claim 10, wherein the solution manager performs the pre-update tasks.

12. The CRM of claim 10, wherein the pre-update tasks comprise placing the plurality of nodes in the cluster in maintenance mode.

13. The CRM of claim 10, wherein the pre-update tasks comprise moving a workload from a first node of the plurality of nodes to a second node of the plurality of nodes in the cluster, wherein the second node is not one of the at least one of the plurality of nodes being updated.

14. The CRM of claim 10, further comprising functionality for:
after performing the update of the one or more plurality of nodes in the cluster:
notifying the solution manager to initiate a performance of post-update tasks associated with at least one of the plurality of nodes.

15. The CRM of claim 14, wherein the post-update tasks comprise notifying the solution manager that the update is complete.

16. The CRM of claim 14, where in the post-update tasks comprise removing at least one of the plurality of nodes in the cluster from a maintenance mode, wherein the at least one of the plurality of nodes was placed in maintenance mode in response to performance of a pre-update task.

17. The CRM of claim 14, wherein the post-update tasks comprise moving a workload from a second node of the plurality of nodes to a first node of the plurality of nodes, wherein the workload was moved from the first node the second node in response to performance of a pre-update task.

18. The CRM of claim 14, wherein the post-update tasks comprise rebuilding file system metadata associated with at least one of the plurality of nodes.

19. A system, comprising:
a processor;
memory comprising instructions, which when executed by the processor enables the system to perform a method for managing a plurality of nodes in a cluster, the method comprising:
determining presence of metadata in a plurality of controllers, wherein each node of the plurality of nodes comprises one of the plurality of controllers;
obtaining the metadata from one or more of the plurality of controllers, wherein the metadata from each controller comprises:
an identifier that identifies a solution group, wherein each of the plurality of nodes is associated with at least one of the solution groups;
a processing sequence number associated with the solution group; and
pre-update tasks associated with updating the node associated with the controller;
processing the metadata to obtain the solution groups and a processing sequence that specifies a sequence for performing updates on one or more nodes associated with the solution groups;
notifying a solution manager to initiate performance of the pre-update tasks associated with at least one of the one or more nodes associated with the solution groups; and
performing, after the notifying, an update of the at least one of the one or more nodes in the cluster based on the solution groups and processing sequence of the solution groups.

20. The system of claim 19, wherein the solution manager performs the pre-update tasks.

* * * * *